United States Patent [19]
Iida

[11] Patent Number: 5,592,291
[45] Date of Patent: Jan. 7, 1997

[54] SPECTROPHOTOMETER

[75] Inventor: Atsuhiro Iida, Nagaokakyo, Japan

[73] Assignee: Shimadzu Corporation, Kyoto, Japan

[21] Appl. No.: 651,859

[22] Filed: May 21, 1996

[30] Foreign Application Priority Data

May 23, 1995 [JP] Japan .................................. 7-149577

[51] Int. Cl.$^6$ .................................................. G01J 3/36
[52] U.S. Cl. .......................................... 356/326; 356/328
[58] Field of Search .................................... 356/326, 328

[56] References Cited

U.S. PATENT DOCUMENTS 4,544,271  10/1985  Yamamoto ............................ 356/328

FOREIGN PATENT DOCUMENTS 6-34525  2/1994  Japan .

*Primary Examiner*—Vincent P. McGraw
*Attorney, Agent, or Firm*—Oliff & Berridge

[57] ABSTRACT

In a spectrophotometer according to the present invention, electric signal from a photo-detector is converted into digital data by an A/D convertor and stored in a memory. In the process of correcting data, a signal processing unit first reads out from the memory data of a wavelength of a plurality of points consisting of a target point to be corrected and other points in a predetermined proximity of the target point in the two-dimensional area on the sample surface. Then the signal processing unit corrects the data of the target point using the data of the other proximal points. In correcting data, a set of two weights $a_i$ and $b_j$ are assigned to every one of the points, where the values of the weights $a_i$ change according to the position of the points in the X direction and the values of the weights $b_j$ change according to the position of the points in the Y direction. By predetermining the values of the weights $a_i$ and $b_j$ properly, the difference in the resolving power between the X direction and the Y direction is cancelled.

4 Claims, 2 Drawing Sheets

SPECTROPHOTOMETER

The present invention relates to a spectrophotometer, particularly to that used for a spectral analysis of a two-dimensional target area of a sample.

BACKGROUND OF THE INVENTION

A conventional spectrophotometer is proposed in the Japanese Published Unexamined Patent Application No. H6-34525 which can be used for a spectral analysis of a two-dimensional target area of a sample at high speed. FIG. 4 is a diagram showing the configuration of the optical system of the conventional spectrophotometer. When a rod-shaped light source (10) throws light on a sample (11), the light illuminates uniformly around a linear target section to be measured extending along the Y axis on the sample (11). Light from the linear target section passes through a lens (12) and is converged onto a slit (13). The light passing through the slit (13) is projected onto a diffraction grating (14), on which an image of the linear target section is formed. The light is dispersed with respect to the wavelength by the diffraction grating (14), where the direction of the dispersion is perpendicular to the length of the image of the linear target section. The dispersed light is reflected by a mirror (15) and arrives at a photo-detector (16), on which a two-dimensional image (which is referred to as a "spacial-chromatic image") is formed. One dimension (which will be referred to as the second dimension later) of the spacial-chromatic image corresponds to the length of the linear target section on the sample (11) and the other dimension (which will be referred to as the third dimension later) corresponds to the wavelength of the chromatic spectrum of each point in the linear target section. The photo-detector (16) consists of a large number of photocells arrayed in two dimensions corresponding to the two dimensions cited above. Thus the photo-detector (16) detects at a time the chromatic spectra (where a chromatic spectrum is a distribution of intensity with respect to the wavelength) of all the points in the linear target section on the sample (11).

The sample (11) is placed on a stage (not shown) which is movable along the direction (X direction) perpendicular to the length of the linear target section (Y direction). The stage is moved step by step in the X direction plurality of times, while in each step the chromatic spectra of all the points in the linear target section are measured as described above, until the whole two-dimensional target area of the sample (11) is swept. The distance moved by the sample (11) corresponds to the first dimension.

The spacial resolving power of the above apparatus in the Y direction, or in the length of the linear target section, on the sample (11), which corresponds to the longitudinal direction of the slit (13), depends on the number of the photocells included in the scope of the spacial-chromatic image projected on the photo-detector (16) in the second dimension. On the other hand, the spacial resolving power in the X direction, or in the dimension perpendicular to the length of the linear target section of the sample (11), which corresponds to the direction perpendicular to the longitudinal direction of the slit (13), depends mainly on the width of the slit (13). Practically, however, the size of the spacial-chromatic image projected on the photo-detector (16) depends on the configuration of the optical system, and besides, there is only limited choice for the size of the photocells practically used. Therefore the degree of freedom is low in determining the number of photocells in the scope of the projected image. Besides, the degree of freedom in determining the width of the slit is also low since it is significantly related to the chromatic (or wavelength) resolving power. For such reasons, it is difficult to design an apparatus whose resolving power in the X direction on the sample (11) is equal to that in the Y direction. Such a difference in the resolving power between the two directions on the sample (11), however, causes a problem that measurement results come to differ depending on how a sample is placed with respect to the longitudinal direction of the slit even when the same area of the same sample is measured, so that the reliability and reproducibility of measurement deteriorates.

Thus, a spectrophotometer for spectral analysis of a two-dimensional target area of a sample has been demanded by which the same result can be obtained from the same sample irrespective of how the sample is placed.

SUMMARY OF THE INVENTION

In view of the above problems, the present invention provides a spectrophotometer for carrying out a spectral analysis of a two-dimensional target area of a sample, including:

moving mechanism for moving the sample in a first direction;

a slit having a length in a second direction which is perpendicular to the first direction;

a dispersing element, such as a diffraction grating or a prism, for dispersing light from each point of the slit in a third direction which is perpendicular to the second direction;

a photo-detector consisting of a plurality of photocells arrayed two-dimensionally in the second direction and in the third direction;

sampling unit for receiving a signal from the photo-detector, for generating digital data of each point of a three-dimensional space corresponding to the first, the second and the third directions, and for saving the digital data to a memory while the sample is moved; and arithmetic operating unit for reading out data from the memory and for correcting data of a target point in the three-dimensional space using data of a plurality of points in a proximity of the target point in a two-dimensional space of the first and the second directions.

The resolving power of a spectrophotometer, and the difference in the resolving power between the first dimension and the second dimension, is almost determined by the optical system composed of the optical elements used (e.g., the slit, lens, photo-detector, etc.) and their configuration. Such difference can be observed by measuring a reference sample beforehand using the optical system and analyzing the measurement result. Then, a parameter or parameters for use in the correction by the arithmetic operating unit are extracted from the difference thus observed, where the parameter or parameters are determined so that the difference is cancelled and the resolving power in the two dimensions is equalized.

When a sample is measured in the spectrophotometer of the present invention, a linear image of a linear target section corresponding to the slit is formed on the dispersing element, and the light at every point of the linear image is dispersed with respect to the wavelength in the direction perpendicular to the length of the image. Thus a two-dimensional image is formed on the photo-detector, one dimension (second direction) corresponding to the length of the linear target section and the other dimension (third direction) corresponding to the chromatic dispersing. The two-dimensionally arrayed photocells of the photo-detector convert the intensity at every point of the two-dimensional image into electrical signal.

While the moving mechanism moves the sample, the sampling unit receives the intensity signal from the photocells and converts the signal into digital data, which is saved in the memory. When the moving mechanism moves the sample a preset distance in the first direction and the linear target section sweeps through a preset two-dimensional target area of the sample, the data stored in the memory has a three-dimensional structure: the first dimension corresponds to the distance moved by the sample; the second dimension corresponds to the length of the linear target section; and the third dimension corresponds to the wavelength.

Then the arithmetic operating unit reads out data in the memory and correct data point by point. Specifically, in correcting data of a target point, the arithmetic operating unit reads out data of plural points in the proximity of the target point in the two-dimensional space of the first and the second directions. That is, data of a point at a wavelength is corrected using data of points in the spacial neighbors. In correcting the data, the parameter or parameters previously determined are used. When all the data are corrected, the difference in the resolving power in the two dimensions on the sample surface is cancelled. Specific method will be detailed in the description of the embodiment that follows.

The spectrophotometer of the present invention can be used in various measuring machines or analyzing machine, such as a reflectance meter, a transmittance meter or a fluorescent analyzer.

DETAILED DESCRIPTION OF A PREFERRED EMBODIMENT

An embodiment of the present invention is described as follows, referring to FIGS. 1 to 3.

Figure 1:
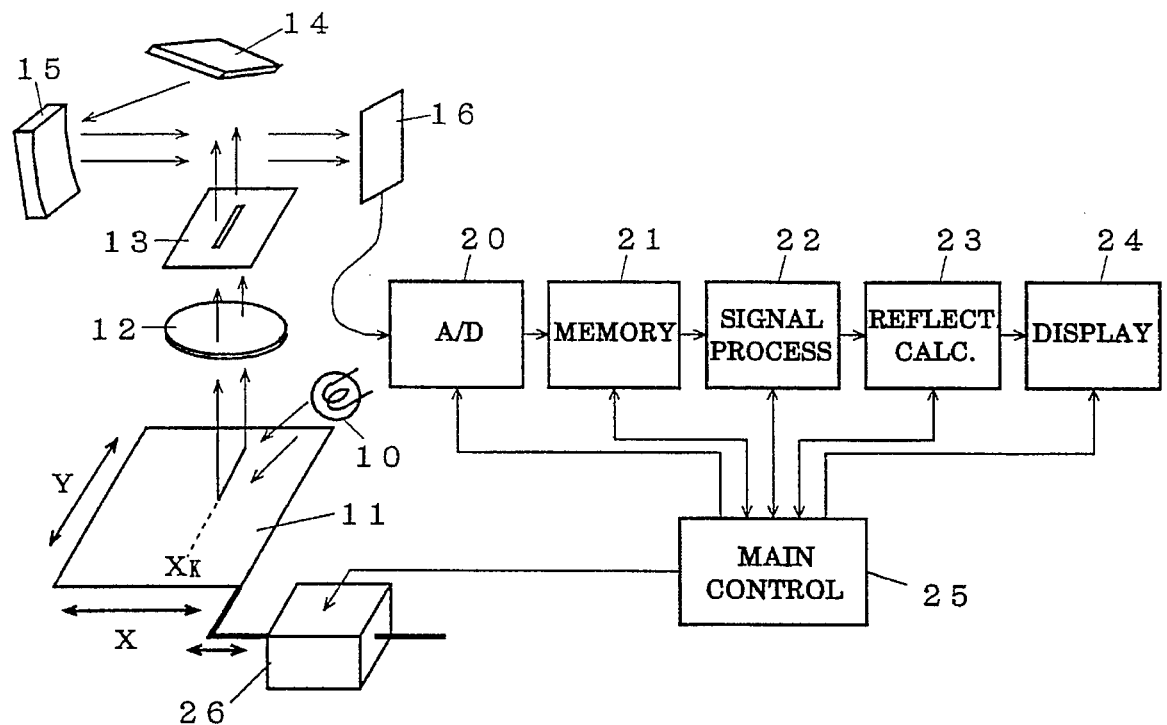
FIG. 1 is a schematic diagram of a spectrophotometer as an embodiment of the present invention.
Figure 4:
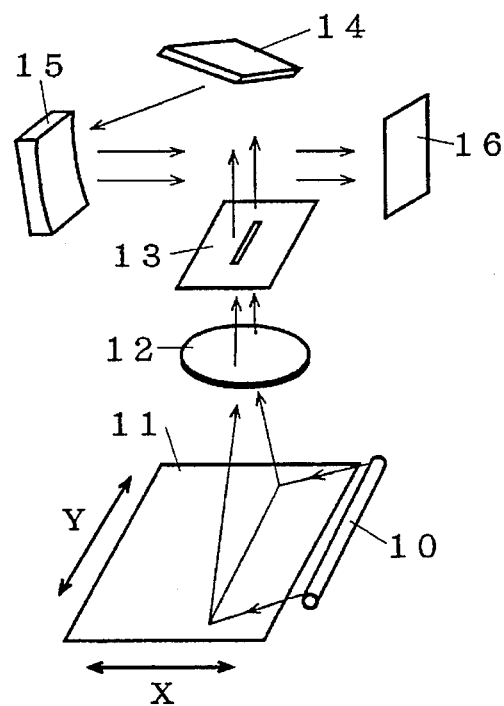
FIG. 4 is a diagram showing a configuration of an optical system of a conventional spectrophotometer for spectral measurement of a two-dimensional target area.

In FIG. 1, the configuration and operation of the optical system for projecting a two-dimensional image onto the photo-detector (16) is the same as those in FIG. 4. When the spacial-chromatic image is formed on the photo-detector (16), photocells in the photo-detector (16) convert the optical energy of the image into electric signal. An A/D convertor (20) receives the electric signals from all the photocells of the photo-detector (16) and, according to a sampling control signal from a main control unit (25), generates digital data for every photocell, which is stored in the memory unit (21) one after another. Thus, when the sample (11) is moved a preset distance by a moving mechanism (26) according to a movement control signal from the main control unit (25), and a predetermined two-dimensional area of the sample (11) is swept by the linear target section, a set of data having a three-dimensional structure is stored in the memory unit (21). The first dimension corresponds to the distance moved by the sample (11), the second dimension corresponds to the length of the linear target section of the sample (11), and the third dimension corresponds to the wavelength of the spectra of each point in the linear target section. In the three dimensions, the second and third dimensions constitute the two dimensions of the spacial-chromatic image, and the first and the second dimensions constitute the two-dimensional surface area of the sample (11) to be measured.

In the process of correcting data, a signal processing unit (22) reads out both data of a target point and other points required for correcting the data of the target point, and corrects the data of the target point using the data of said other points by a method described later. A reflectance calculating unit (23) calculates the reflectance of the sample (11) using a spectrum or spectra constructed by the corrected data, and the result is displayed on a display unit (24). If necessary, characteristic values other than the reflectance, such as a transmittance, can be calculated using the corrected data and can be displayed on the display unit (24). For displaying the result, any conventional output device such as a cathode ray tube, a printer, etc. may be used.

Figure 2:
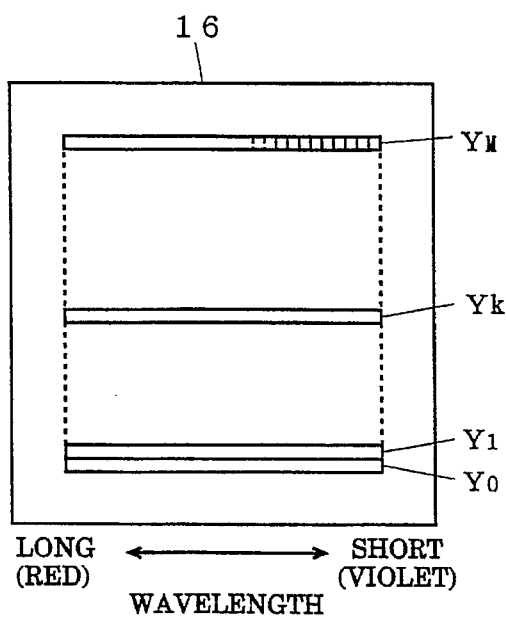
FIG. 2 shows a spacial-chromatic image projected on the photo-detector.
Figure 3:
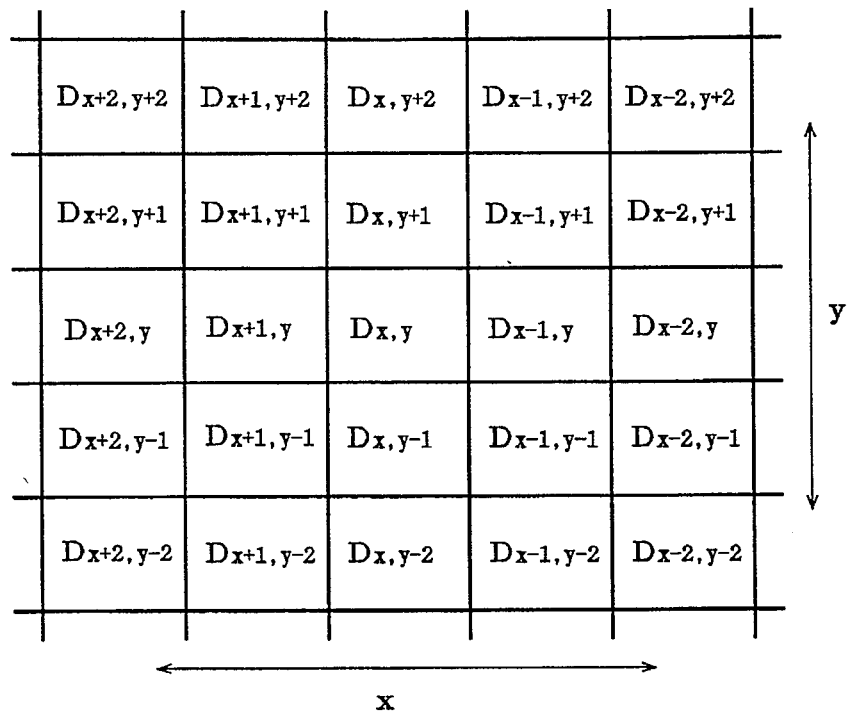
FIG. 3 is a diagram of two-dimensional data for explaining the arithmetic operation carried out in a spectrophotometer according to the present invention.

FIG. 2 shows a spacial-chromatic image formed on the photo-detector (16). A spacial-chromatic image corresponds to a linear section of the sample (11), i.e. a section extending in the Y direction at a position $X_k$ (k=0 to N) in FIG. 1. In FIG. 2, a chromatic spectrum corresponding to a position $Y_k$ (k=0 to M) is projected on the photo-detector (16) as a linear image extending in the lateral (wavelength) direction. When a two-dimensional target area on the sample (11) is to be analyzed, the position $X_k$ of the linear section is changed from $X_0$ to $X_k$ step by step, thus obtaining (M+1)×(N+1) sets of data of the spectra corresponding to (M+1)×(N+1) points (or elementary sections) on the sample (11). A spectrum is composed of a series of intensity data arrayed in the direction of the wavelength. Thus the three-dimensional structure of the data is formed in the memory unit (21).

The data stored in the memory unit (21) is then corrected by a predetermined process from point to point of the two-dimensional area of the sample (11). FIG. 3 shows intensity data of twenty-five points arrayed in the X and Y directions corresponding to an arbitrary wavelength. It should be noted that FIG. 3 is a representation of the spacial array of the points on the sample (11), and the data need not be arrayed as in FIG. 3 when they are stored in the memory unit (21).

In the present embodiment, the data of the twenty-five points are used to correct data of a target point at the center of the twenty-five points. The twenty-five points consist of: the target point itself; eight points adjacently surrounding the target point; and sixteen points adjacently surrounding the eight points. Denoting the value of the data of the target point as D(x,y), the value of a corrected data D(x,y) for the same point is obtained by $$[D(x,y)] = \Sigma[i=-2:2]\Sigma[j=-2:2]D(x+i,y+j)\cdot k_{ij} \qquad (1),$$

here, $\Sigma[n=-2:2]$ denotes the sum of the operands from n=−2 to n=2.

In the formula (1), $k_{ij}$ is a coefficient obtained from the multiplication of a weight $a_i$ and a weight $b_j$. Here a set of two weights $a_i$ and $b_j$ are assigned to every one of the twenty-five points, and the values of the weights $a_i$ (i=−2 to 2) change according to the position of the points in the X direction and the values of the weights $b_j$ (j=−2 to 2) change according to the position of the points in the Y direction.

According to the formula (1), when the values of $a_{+1}$, $a_{-1}$, $a_{+2}$, $a_{-2}$, $b_{+1}$, $b_{-1}$, $b_{+2}$ and $b_{-2}$ are set substantially smaller than $a_0$ and $b_0$, the smoothing effect becomes weak. When, on the other hand, the values of the weights of the surrounding points are set almost comparable to the weights of the target point, the smoothing effect becomes considerably strong. Hence, by determining the values of the weights appropriately, the spacial resolving power in one direction is equalized to the spacial resolving power in the other direction on the sample (11). The values of the weights are determined, for example, as follows.

As described above, the spacial resolving power in the X direction depends mainly on the width of the slit (13), and that in the Y direction depends mainly on the size of the photocells constituting the photo-detector (16). Therefore, so long as a spectrophotometer comprises the same set of optical parts configured in the same manner, the spectrophotometer has its own fixed resolving power. The resolving power in the X and Y directions can be measured beforehand by actually obtaining spectra of a reference sample. That is, by analyzing the spectra data thus obtained, the value of the weights $a_{+1}$, $a_{-1}$, $a_{+2}$, $a_{-2}$, $b_{+1}$, $b_{-1}$, $b_{+2}$ and $b_{-2}$ are determined to cancel the difference in the resolving power of the two directions.

For carrying out the above-described process of correcting data at high speed, a digital signal processor, an LSI specially designed for high-speed integrating operations or the like may be suitably used in the signal processing unit (22).

Though, in the above embodiment, data of twenty-five points are used to correct the data of a target point positioned at the center, it should be noted that the number of points used for correcting one point may be changed, and the process of correcting data may be carried out in some other way. For example, when complete cancellation of the difference in the resolving power is demanded first, a process with higher precision may be employed in which more than twenty-five points are used with a set of dexterously determined weights; when, on the other hand, the speed in correcting data is demanded first, a simpler process may be employed wherein less than twenty-five points are used. Of course, the present invention may be embodied in other specific forms, and it should be understood that any embodiment covered by the appended claims falls within the true spirit and scope of the present invention.

What is claimed is:

1. A spectrophotometer for carrying out a spectral analysis of a two-dimensional target area of a sample, comprising:

moving means for moving the sample in a first direction;

a slit having a length in a second direction which is perpendicular to the first direction;

a dispersing element for dispersing light from each point of the slit in a third direction which is perpendicular to the second direction;

a photo-detector consisting of a plurality of photocells arrayed two-dimensionally in the second direction and in the third direction;

sampling means for receiving a signal from the photo-detector, for generating digital data of each point of a three-dimensional space corresponding to the first, the second and the third directions, and for saving the digital data to a memory while the sample is moved; and arithmetic operating means for reading out data from the memory and for correcting data of a target point in the three-dimensional space using data of a plurality of points in a proximity of the target point in a two-dimensional space of the first and the second directions.

2. A spectrophotometer according to claim 1, wherein the arithmetic operating means correct data of the target point by adding value of the data of target point and values of the data of the proximal points, where each of the values of the data is assigned two weights, and where values of one weight change according to a position of the point in the first direction and values of another weight change according to a position of the point in the second direction.

3. A spectrophotometer according to claim 2, wherein the values of the weights are set different in the first direction and in the second direction so that a difference in a resolving power of an optical system of the spectrophotometer in the first direction and in the second direction is cancelled.

4. A spectrophotometer according to claim 2, wherein the proximal points are composed of eight nearest points surrounding the target point and sixteen points surrounding the eight nearest points.

* * * * *